(12) United States Patent
Matsuda et al.

(10) Patent No.: US 11,973,246 B2
(45) Date of Patent: Apr. 30, 2024

(54) METHOD FOR MANUFACTURING FUEL BATTERY CELL SEPARATOR GASKET

(71) Applicant: NOK CORPORATION, Tokyo (JP)

(72) Inventors: Taisuke Matsuda, Kanagawa (JP); Shigeru Watanabe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 265 days.

(21) Appl. No.: 17/619,026

(22) PCT Filed: Sep. 1, 2020

(86) PCT No.: PCT/JP2020/033026
§ 371 (c)(1),
(2) Date: Dec. 14, 2021

(87) PCT Pub. No.: WO2021/054113
PCT Pub. Date: Mar. 25, 2021

(65) Prior Publication Data
US 2022/0302475 A1    Sep. 22, 2022

(30) Foreign Application Priority Data
Sep. 18, 2019 (JP) ................................. 2019-169232

(51) Int. Cl.
*H01M 8/0286* (2016.01)
(52) U.S. Cl.
CPC .................................. *H01M 8/0286* (2013.01)
(58) Field of Classification Search
CPC ............. H01M 8/0273; H01M 8/0286; H01M 8/0271; H01M 8/0297; H01M 2008/1095
(Continued)

(56) References Cited

U.S. PATENT DOCUMENTS 10,465,798 B2    11/2019 Saso et al.
10,511,034 B2    12/2019 Horimoto et al.
(Continued)

FOREIGN PATENT DOCUMENTS

JP    2016-143479    8/2016
JP    2017-54727     3/2017
(Continued)

OTHER PUBLICATIONS

International Search Report issued in International Patent Application No. PCT/JP2020/033026, dated Oct. 27, 2020, along with an English translation thereof.
(Continued)

*Primary Examiner* — James D Sells
(74) *Attorney, Agent, or Firm* — Greenblum & Bernstein, P.L.C.

(57) ABSTRACT

A method of shaping a gasket on a separator without causing destruction and damage. A fuel battery separator gasket is shaped via a shaping of a sticking agent and a transfer of the sticking agent. During the shaping, the sticking agent to be the gasket is shaped on a flexible substrate having flexibility. During the transfer, the sticking agent shaped on the flexible substrate is transferred to one of a pair of separators facing each other with an electrolyte membrane provided in a fuel battery cell being interposed therebetween and each having a bead forming a flow path of fluid between the bead and the electrolyte membrane in close contact with the electrolyte membrane to shape the gasket.

18 Claims, 15 Drawing Sheets

(58) Field of Classification Search
USPC .......................................................... 156/232
See application file for complete search history.

(56) References Cited

U.S. PATENT DOCUMENTS

| | | |
|---|---|---|
| 10,865,881 B2 | 12/2020 | Yui et al. |
| 10,950,874 B2 | 3/2021 | Koga |
| 10,960,599 B2 * | 3/2021 | Yoshida ................ B29C 59/026 |
| 2017/0365863 A1 | 12/2017 | Horimoto et al. |
| 2018/0163870 A1 | 6/2018 | Saso et al. |
| 2019/0128423 A1 | 5/2019 | Yui et al. |
| 2019/0296370 A1 | 9/2019 | Koga |

FOREIGN PATENT DOCUMENTS

| | | |
|---|---|---|
| WO | 2016/194573 | 12/2016 |
| WO | 2017/188059 | 11/2017 |
| WO | 2017/195489 | 11/2017 |
| WO | 2017/199644 | 11/2017 |
| WO | 2017/212775 | 12/2017 |

OTHER PUBLICATIONS

Written Opinion issued in International Patent Application No. PCT/JP2020/033026, dated Oct. 27, 2020.
English translation of Written Opinion issued in International Application No. PCT/JP2020/033026, dated Oct. 27, 2020.

* cited by examiner

METHOD FOR MANUFACTURING FUEL BATTERY CELL SEPARATOR GASKET

TECHNICAL FIELD

The disclosure relates to a method for manufacturing a fuel battery cell separator gasket.

BACKGROUND ART

Fuel cells which generate electric power by electrochemical reaction of reaction gas are rapidly becoming widespread. The fuel cells have been attracting attention as a preferable energy source because they are high in power generation efficiency and have little impact on the environment.

Among the fuel cells, the solid polymer type has a stack structure in which a plurality of fuel battery cells are stacked. Each individual fuel battery cell has a membrane electrode assembly (MEA) sandwiched between a pair of separators. The membrane electrode assembly is of a structure in which an electrolyte membrane is sandwiched between an anode electrode and a cathode electrode. Each electrode has a stacked structure of a catalyst layer and a gas diffusion layer (GDL). The separator is in close contact with the gas diffusion layer and forms a flow path for hydrogen and oxygen between the separator and the gas diffusion layer.

Such a fuel battery cell uses the flow path formed in the separator to supply hydrogen to the anode electrode and oxygen to the cathode electrode. Consequently, power is generated by the electrochemical reaction opposite to the electrolysis of water.

As shown in the respective figures of Patent Document 1, the electrolyte membrane (reference numeral 55 in Patent Document 1) of the membrane electrode assembly is sealed at the end thereof. As the seal, for example, such gaskets (gasket bodies 21, 31) as described in Patent Document 1, which are formed of a rubber-like elastic body or the like are used. The gasket elastically deforms in a direction orthogonal to the surface of the separator and seals the electrolyte membrane of the membrane electrode assembly between the pair of separators.

PRIOR ART DOCUMENT

Patent Document

Patent Document 1: Japanese Patent Application Laid-Open No. 2016-143479

SUMMARY

Problem to be Solved

The gasket which seals the electrolyte membrane is shaped on the separator by injection molding or transfer molding. At this time, a brittle separator such as one made of carbon may be destroyed by the pressure at the time of gasket molding, for example, the pressure due to the mold pressing or the injection pressure or the like. Also, even with a relatively hard metal-made separator, when carbon coating or the like is applied to the surface, the coating may be damaged by the pressure during gasket molding.

It is required to enable the gasket to be shaped on the separator without causing breakage or damage.

Means for Solving the Problem

One aspect of a method for manufacturing a fuel battery separator gasket is to shape a sticking agent to be a gasket on a flexible substrate having flexibility by using a shaping mold, and transfer the sticking agent shaped on the flexible substrate to one of a pair of separators facing each other with a mating member interposed therebetween and each having a bead forming a flow path of fluid between the bead and the mating member in close contact with the mating member to thereby shape the gasket.

Another aspect of a method for manufacturing a fuel battery separator gasket is to shape a sticking agent to be a gasket on an intermediate substrate by using a shaping mold, transfer the sticking agent shaped on the intermediate substrate to a flexible substrate having flexibility, and transfer the sticking agent transferred to the flexible substrate to one of a pair of separators facing each other with a mating member interposed therebetween and each having a bead forming a flow path of fluid between the bead and the mating member in close contact with the mating member to thereby shape the gasket.

A further aspect of a method for manufacturing a fuel battery separator gasket is to shape a sticking agent to be a gasket on a lower mold of a shaping mold having an upper mold and the lower mold, and transfer the sticking agent shaped on the lower mold to one of a pair of separators facing each other with a mating member interposed therebetween and each having a bead forming a flow path of fluid between the bead and the mating member in close contact with the mating member to thereby shape the gasket.

Effect

A gasket can be shaped on a separator without causing breakage or damage.

DESCRIPTION OF EMBODIMENTS

[Fuel Cell]

A method for manufacturing a fuel battery separator gasket according to the present embodiment is a method of shaping a gasket to be provided on a separator used in a fuel cell and transferring the gasket to the separator. An example of a fuel cell to which the method of the present embodiment is applied will first be described.

Figure 1:
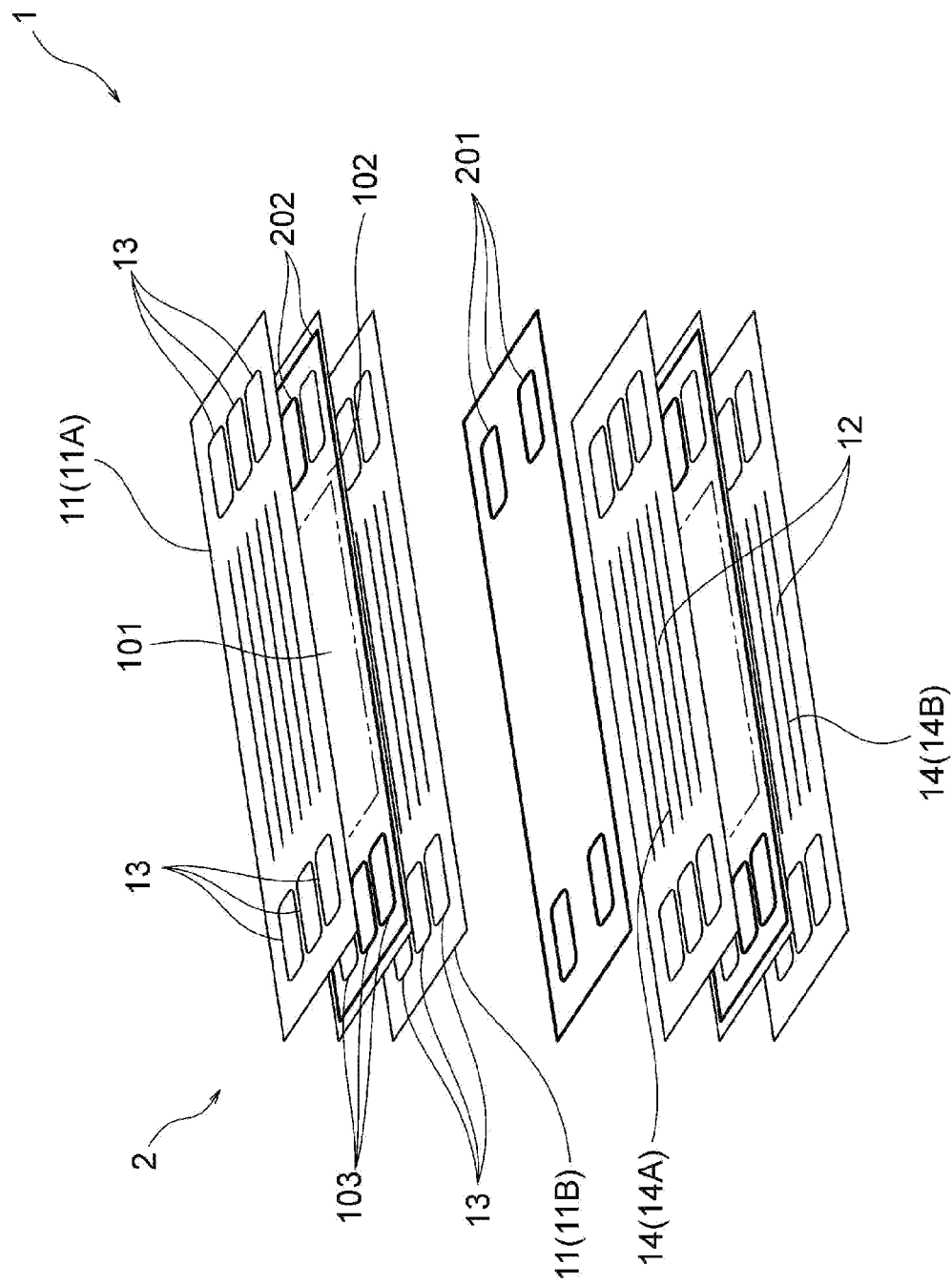
FIG. 1 is a schematic view conceptually showing a stack structure in which a plurality of fuel battery cells are stacked.

As shown in FIG. 1, a fuel cell 1 has a stacked structure in which a plurality of fuel battery cells 2 are stacked. In the fuel battery cell 2, an electrolyte membrane 102 provided with a membrane electrode assembly 101 called a MEA (Membrane Electrode Assembly) is interposed between a pair of separators 11 for the fuel cell. Such fuel battery cells 2 are stacked through a cooling surface seal 201. In FIG. 1, only two sets of fuel battery cells 2 are drawn, but in reality, hundreds of sets of fuel battery cells 2 are stacked to constitute the fuel cell 1.

The membrane electrode assembly 101 is a structure in which electrodes not shown in the drawing are provided at the central portions of both surfaces of the electrolyte membrane 102. The electrode has a stacked structure having a catalyst layer formed on the electrolyte membrane 102 and a gas diffusion layer (GDL) formed on the catalyst layer (neither is shown). In such an electrode, one surface of the electrolyte membrane 102 is used as an anode electrode, and the surface opposite thereto is used as a cathode electrode.

The separator 11 for the fuel cell is a flat plate-shaped member formed of a resin such as carbon as an example. However, the separator is not limited to the brittle member like such a carbon-made one. As another example, a flat plate-like member that can be pressed, such as a thin stainless steel plate, may be used as the separator 11.

The separator 11 has a rectangular planar shape and is provided with an arrangement region 12 for arranging the membrane electrode assembly 101. Openings provided three by three at positions of both ends out of the arrangement region 12 are manifolds 13 for circulating fluid used for power generation or generated by power generation. The fluid caused to flow through the manifolds 13 is a fuel gas (hydrogen), an oxidizing gas (oxygen), water generated by electrochemical reaction during power generation, an excess oxidizing gas, a refrigerant, or the like.

The manifolds 103 are provided even on the electrolyte membrane 102 in alignment with the manifolds 13 provided on the separator 11. These manifolds 103 are openings which are respectively provided three at positions of both ends away from the membrane electrode assembly 101.

The fuel cell 1 uses the manifolds 13 and 103 to introduce the fuel gas (hydrogen) between the electrolyte membrane 102 provided with the membrane electrode assembly 101 and the separator 11A facing one surface of the electrolyte membrane 102, and to introduce the oxidizing gas (oxygen) between the electrolyte membrane 102 and the separator 11B facing the surface opposite to one surface of the electrolyte membrane 102. Cooling water used as the refrigerant is introduced between the two sets of fuel battery cells 2 sealed by the cooling surface seal 201. At this time, the fuel gas, the oxidizing gas, and the cooling water flow through respective flow paths formed by the pair of separators 11 (11A, 11B) that assemble the fuel battery cell 2.

The pair of separators 11 face each other with the electrolyte membrane 102 as a mating member interposed therebetween to form the fuel battery cells 2. The separator 11 includes a bead 14 that forms a fluid flow path between the separator and the electrolyte membrane 102 in close contact with the electrolyte membrane 102. A space between the electrolyte membrane 102 and the bead 14A of the separator 11A forms a flow path for the fuel gas. A space between the electrolyte membrane 102 and the bead 14B of the separator 11B forms a flow path for the oxidizing gas. A space between the beads 14A and 14B provided between the separator 11A of one set of fuel battery cells 2 and the separator 11B of the set of fuel battery cells 2 overlapping the separator 11A forms a flow path for the cooling water.

The fuel battery cell 2 has a seal structure at the outer peripheral edges of the separator 11 and the membrane electrode assembly 101, and at the peripheral edges of the manifolds 13 and 103. The seal structure includes a cooling surface seal 201 interposed between the two sets of fuel battery cells 2 and a reaction surface seal 202 provided between the separator 11 and the membrane electrode assembly 101. In such a seal structure, the flow path for the fuel gas and the surplus fuel gas, the flow path for the oxidizing gas and the water generated by the electrochemical reaction at the power generation, and the flow path for the cooling water as the refrigerant are made independent of each other to prevent mixing of different types of fluids.

A gasket 203 fixed to the separator 11 is used for the cooling surface seal 201 and the reaction surface seal 202 which form the seal structure. Hereinafter, embodiments of a method for manufacturing a gasket for a fuel cell separator will be described.

First Embodiment

A first embodiment will be described based on FIGS. 2 (A) through 2 (C) and FIGS. 3 (A) through 3 (D). The gasket manufacturing method of the present embodiment includes a shaping step and a transfer step.

[Shaping Step]

The shaping step is a step of shaping a sticking agent 211 to be a gasket 203 on a flexible substrate 301 having flexibility, for example, a resin film.

Figure 2:
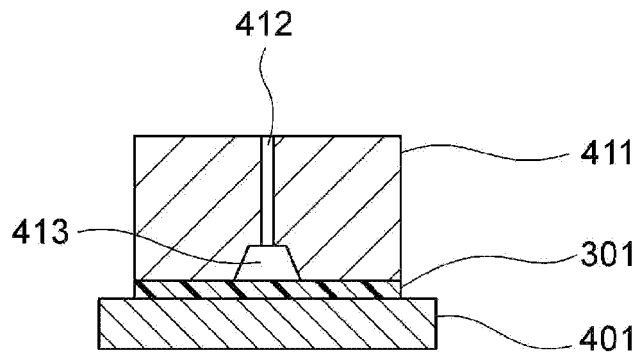
FIGS. 2 (A) through 2 (C) are vertical cross-sectional views temporally showing each step executed upon shaping a sticking agent as a first embodiment.
Figure 2:
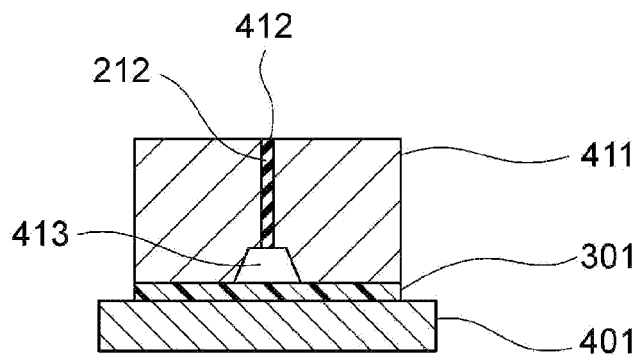
Figure 2:
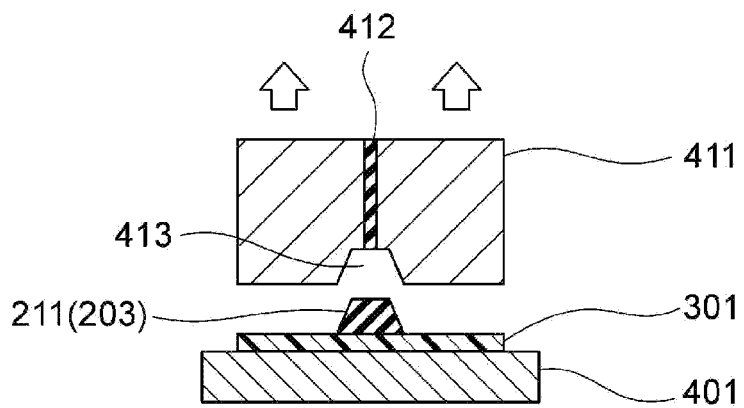

As shown in FIG. 2 (A), the flexible substrate 301 is placed on a base 401, and a shaping mold 411 is placed thereon via the flexible substrate 301. The shaping mold 411 is provided with a gate 412 and a cavity 413. The cavity 413 has a shape for forming the gasket 203.

As shown in FIG. 2 (B), a material 212 of the sticking agent 211, for example, unvulcanized butyl rubber or the like, which is a rubber-like elastic material, is guided from the gate 412 to the cavity 413. As a molding method at this time, injection molding or transfer molding is adopted.

As shown in FIG. 2 (C), the sticking agent 211 is shaped on the flat surface of the flexible substrate 301 by separating the shaping mold 411 from the base 401. The shaped sticking agent 211 becomes the gasket 203.

In order to allow the sticking agent 211 to be shaped on the flexible substrate 301 by separating the shaping mold 411 from the base 401, the flexible substrate 301 is configured to exhibit stronger stickiness than a wall portion of the cavity 413.

As the sticking agent 211 used in the shaping step, e.g., a rubber-based sticking agent using, as base polymer, butyl rubber, polyisobutylene rubber, styrene-butadiene rubber, ethylenepropylene diene rubber, natural rubber, or the like can be used.

It is also possible to blend the sticking agent 211 with additives. The additives that can be blended include, for example, cross-linking agents, tackifiers, fillers, anti-aging agents, and the like.

[Transfer Step]

The transfer step is a step of transferring the sticking agent 211 shaped on the flexible substrate 301 to the separator 11 to shape the gasket 203.

Figure 3:
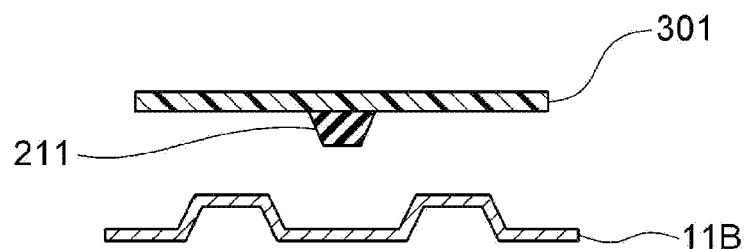
FIGS. 3 (A) through 3 (D) are vertical cross-sectional views temporally showing each step executed upon transferring a sticking agent to a separator as the first embodiment.
Figure 3:
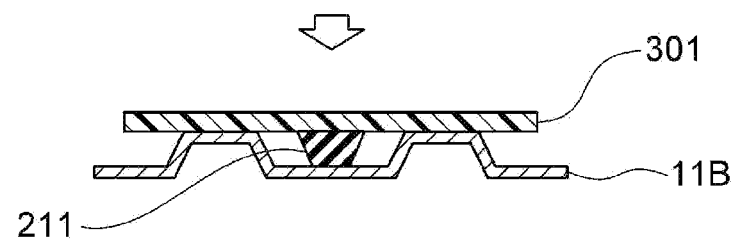
Figure 3:
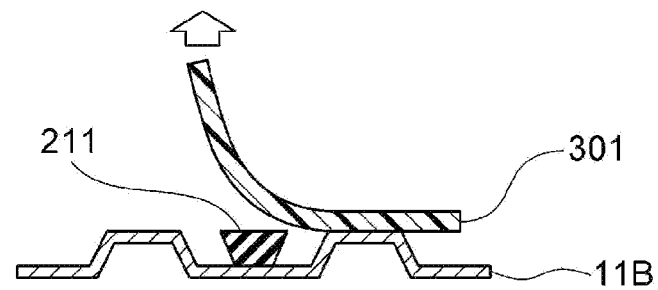
Figure 3:
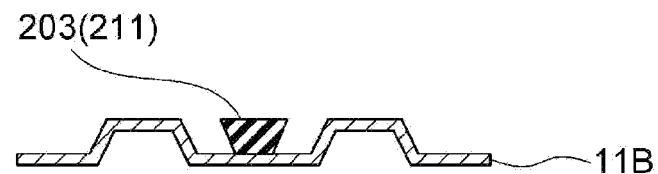

As shown in FIG. 3 (A), the sticking agent 211 shaped on the flexible substrate 301 is faced with one of the separators 11, for example, the separator 11B on the side in contact with the oxidizing gas (oxygen). The position where they face each other is a fixed position of the gasket 203 with respect to the separator 11B. In the present embodiment, a region other than the bead 14B provided on the separator 11B is set as the fixed position.

As a modification of the present embodiment, the top of the bead 14B provided on the separator 11B may be set as a fixed position.

As shown in FIG. 3 (B), the separator 11B and the flexible substrate 301 are brought close to each other, and the sticking agent 211 is brought into contact with the position where the gasket 203 should be fixed. The sticking agent 211 sticks to the separator 11B due to its own stickiness.

As shown in FIG. 3 (C), the flexible substrate 301 is bent and peeled from the sticking agent 211. At this time, the separator 11B is configured to exhibit stronger stickiness than the flexible substrate 301. Therefore, the sticking agent 211 maintains a state of remaining stuck to the separator 11B, and the flexible substrate 301 is peeled off from the sticking agent 211.

As shown in FIG. 3 (D), as a result, the sticking agent 211 is fixed to the separator 11B, and the sticking agent 211 becomes the gasket 203.

The sticking agent 211 serving as the gasket 203 may or may not be cross-linked. The cross-linking of the sticking agent 211 is carried out after shaping on the flexible substrate 301 or after transferring to the separator 11B.

The gasket 203 can be formed on the separator 11B in this manner. At this time, the separator 11B is not subjected to the pressure at the time of gasket molding, for example, the pressure due to mold pressing or injection pressure, etc., and the gasket 203 can be shaped on the separator 11B without causing breakage or damage. Accordingly, it is possible to use as the separator 11 (11A, 11B), a brittle material such as one made of carbon.

Second Embodiment

A second embodiment will be described based on FIG. 4 and FIGS. 6 (A) through 6 (D). The same parts as those in the first embodiment are designated by the same reference numerals, and a description thereof will also be omitted.

Figure 4:
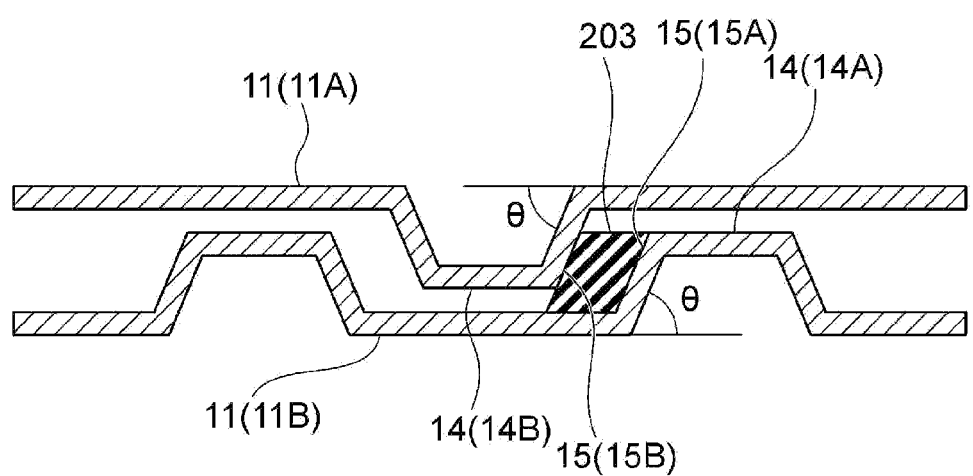
FIG. 4 is a vertical cross-sectional view showing a seal structure of sealing a gap between a pair of separators.

FIG. 4 shows a seal structure of the cooling surface seal 201 and the reaction surface seal 202, which are the premise of a gasket manufacturing method of the present embodiment. In this seal structure, the beads 14 of the separators 11 are overlapped with each other in a nested manner. As an example, the bead 14B of the separator 11B facing the surface opposite to one surface of the electrolyte membrane 102 is formed larger than the bead 14A of the separator 11A facing one surface of the electrolyte membrane 102 provided with the membrane electrode assembly 101. The bead 14B has entered the bead 14A in a non-contact state.

The beads 14 (14A, 14B) of the pair of separators 11 respectively have a rising angle θ from the separator 11, which is set to, for example, about 70°. Therefore, side walls 15 (15A, 15B) of the beads 14 (14A, 14B) facing each other, of the pair of separators 11 are inclined with respect to the separators 11.

The gasket 203 used in such a seal structure is arranged between the side walls 15 (15A, 15B) of the beads 14 (14A, 14B) facing each other by overlapping in the nested manner. Since the rising angle θ of the bead 14 from the separator 11 is about 70°, the gasket 203 has a parallelogram cross-sectional shape.

Similar to the first embodiment, since the gasket 203 is formed by the sticking agent 211, it is stuck and fixed to the side walls 15 (15A, 15B) of the beads 14 (14A, 14B) facing each other, of the pair of separators 11. Further, the gasket 203 is stuck and fixed not only to the side wall 15 of the bead 14 but also to the surface of the separator 11 which communicates with the side wall 15.

The gasket manufacturing method of the present embodiment produces the gasket 203 which conforms to the seal structure of the cooling surface seal 201 and the reaction surface seal 202 as described above. The present manufacturing method includes a shaping step and a transfer step as in the first embodiment.

(Shaping Step)

The shaping step is a step of shaping the sticking agent 211 to be the gasket 203 on the flexible substrate 301 having flexibility, for example, a resin film.

Figure 5:
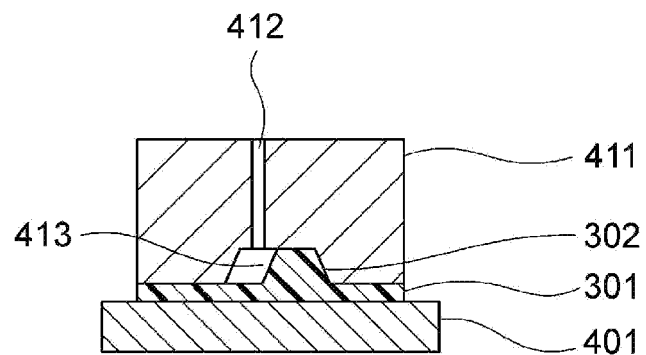
FIGS. 5 (A) through 5 (C) are vertical cross-sectional views temporally showing each step executed upon shaping a sticking agent as a second embodiment.
Figure 5:
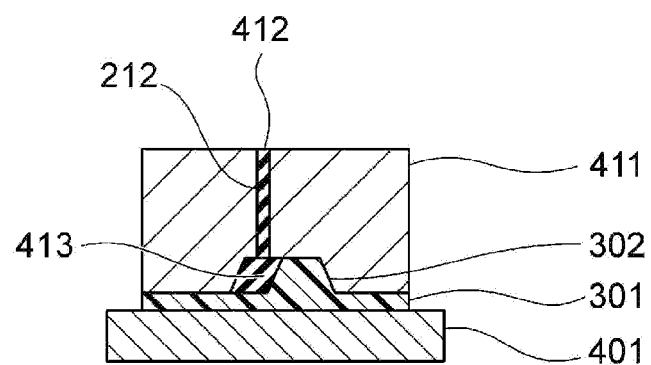
Figure 5:
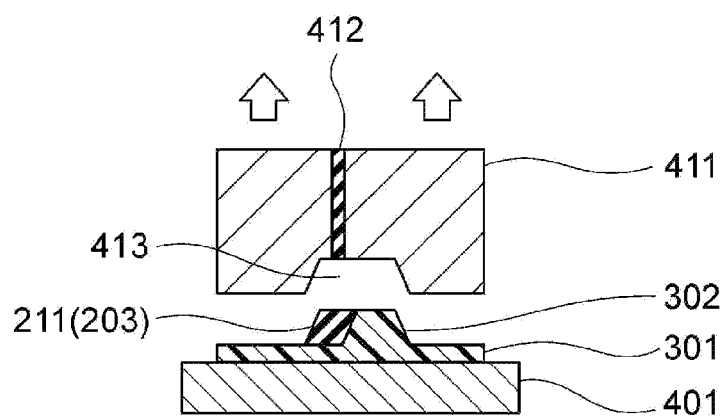

As shown in FIG. 5 (A), the flexible substrate 301 is placed on the base 401, and the shaping mold 411 is placed thereon via the flexible substrate 301. The shaping mold 411 is provided with the gate 412 and the cavity 413.

The flexible substrate 301 includes a protrusion 302 which enters between the two adjacent beads 146 provided on one of the pair of separators 11, for example, the separator 11B on the side in contact with the oxidizing gas (oxygen). Similar to the bead 146, the protrusion 302 rises from the flexible substrate 301 at a rising angle of about 70°. That is, the protrusion 302 is formed in a shape imitating the side wall 15B of the bead 14B to which the sticking agent 211 serving as the gasket 203 is stuck.

The cavity 413 provided in the shaping mold 411 has a shape for forming the gasket 203 at the portion where the protrusion 302 of the flexible substrate 301 is arranged and in communication with the gate 412.

As shown in FIG. 5 (B), the material 212 of the sticking agent 211, for example, unvulcanized butyl rubber or the like, which is a rubber-like elastic material, is guided from the gate 412 to the cavity 413. As the molding method at this time, injection molding or transfer molding is adopted.

As shown in FIG. 5 (C), by separating the shaping mold 411 from the base 401, the sticking agent 211 is shaped on the flexible substrate 301 along the protrusion 302. The shaped sticking agent 211 becomes the gasket 203.

In order to allow the sticking agent 211 to be shaped on the flexible substrate 301 by separating the shaping mold 411 from the base 401, the flexible substrate 301 is configured to exhibit stronger stickiness than the wall portion of the cavity 413.

(Transfer Step)

The transfer step is a step of transferring the sticking agent 211 shaped on the flexible substrate 301 to the separator 11 to form the gasket 203.

Figure 6:
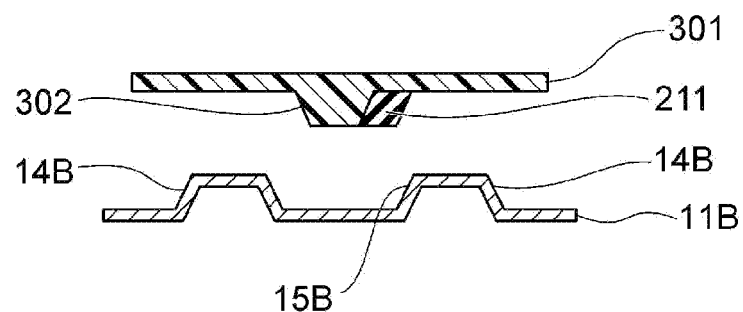
FIGS. 6 (A) through 6 (D) are vertical cross-sectional views temporally showing each step executed upon transferring a sticking agent to a separator as the second embodiment.
Figure 6:
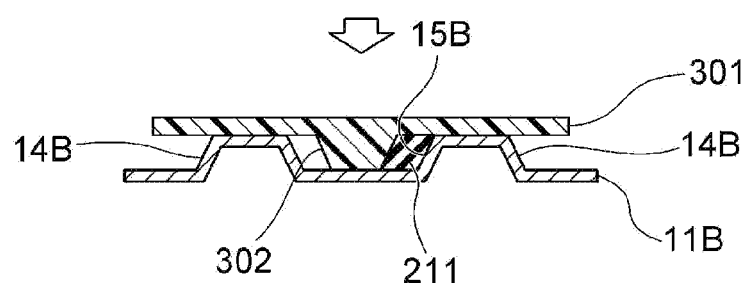
Figure 6:
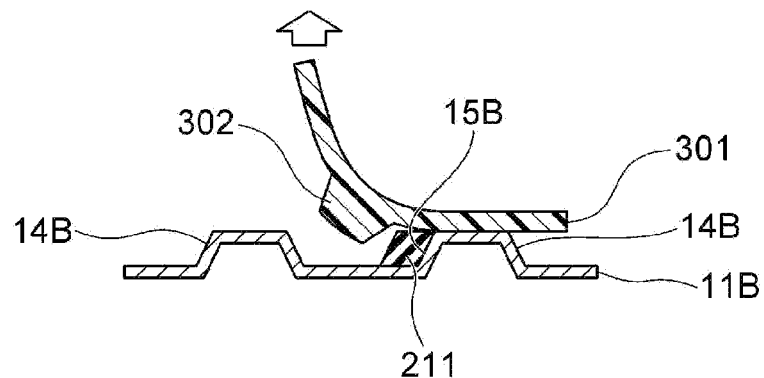
Figure 6:
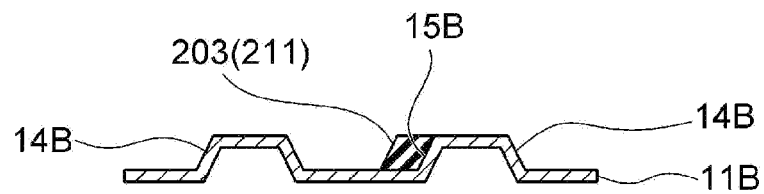

As shown in FIG. 6 (A), the sticking agent 211 shaped on the flexible substrate 301 is made to face the separator 11B on the side in contact with the oxidizing gas (oxygen). The position where they face each other is a fixed position of the gasket 203 with respect to the separator 11B. As shown in FIG. 4, the fixed position of the gasket 203 is the side wall 15B of the bead 14B which is nestedly overlapped with the bead 14A of the separator 11A on the side in contact with the fuel gas (hydrogen).

As shown in FIG. 6 (B), the separator 11B and the flexible substrate 301 are brought close to each other, and the sticking agent 211 is brought into contact with the position where the gasket 203 should be fixed. The sticking agent 211 is stuck to the separator 11B due to its own stickiness.

As shown in FIG. 6 (C), the flexible substrate 301 is bent and peeled from the sticking agent 211. At this time, the separator 11B is configured to exhibit stronger stickiness than the flexible substrate 301. Therefore, the sticking agent 211 maintains a state of remaining stuck to the separator 11B, and the flexible substrate 301 is peeled off from the sticking agent 211.

As shown in FIG. 6 (D), as a result, the sticking agent 211 is fixed to the separator 11B, and the sticking agent 211 becomes the gasket 203.

The gasket 203 can be formed on the separator 11B in this manner. The separator 11B is not subjected to the pressure at the time of gasket molding, for example, the pressure due to mold pressing or injection pressure, etc., and the gasket 203 can be shaped on the separator 11B without causing breakage or damage. Accordingly, it is possible to use as the separator 11 (11A, 11B), a brittle material such as one made of carbon.

Third Embodiment

A third embodiment will be described based on FIGS. 7 (A) through 7 (D) and FIG. 8 (A) through 8 (E). The same parts as those in the second embodiment are designated by the same reference numerals, and a description thereof will also be omitted.

The present embodiment is an example in which the protrusion 302 is formed by embossing the material 212 of the sticking agent 211 against the shaping mold 411 by filling pressure, instead of using the flexible substrate 301 provided with the protrusion 302 in advance. In such a manufacturing method, a more flexible film-like material is used as the flexible substrate 301.

As with the method according to the second embodiment, the gasket manufacturing method of the present embodiment also produces the gasket 203 that conforms to the seal structure of the cooling surface seal 201 and the reaction surface seal 202 such as shown in FIG. 4. The gasket manufacturing method is similar to the gasket manufacturing methods of the first and second embodiments even in that it includes the shaping step and the transfer step.

(Shaping Step)

The shaping step is a step of shaping the sticking agent 211 to be the gasket 203 on the flexible substrate 301 having flexibility such as a resin film. In the present embodiment, a lower mold 411L and an upper mold 411U are used.

Figure 7:
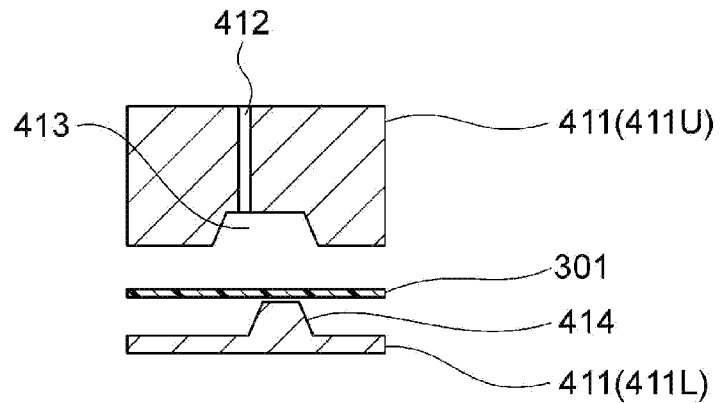
FIGS. 7 (A) through 7 (D) are vertical cross-sectional views temporally showing each step executed upon shaping a sticking agent as a third embodiment.
Figure 7:
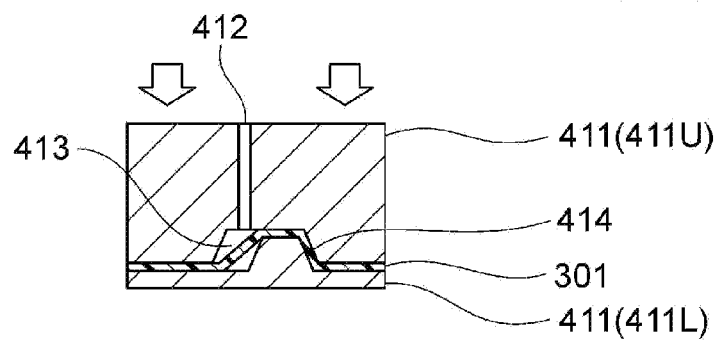
Figure 7:
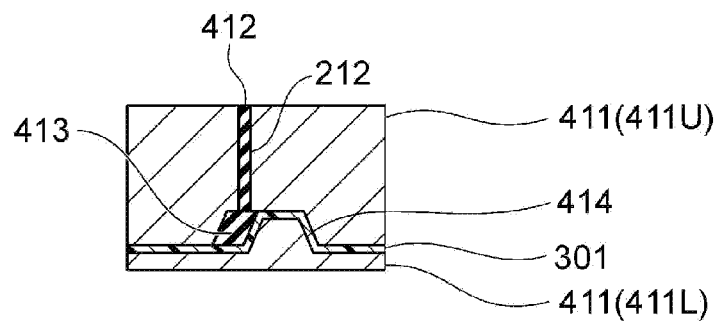
Figure 7:
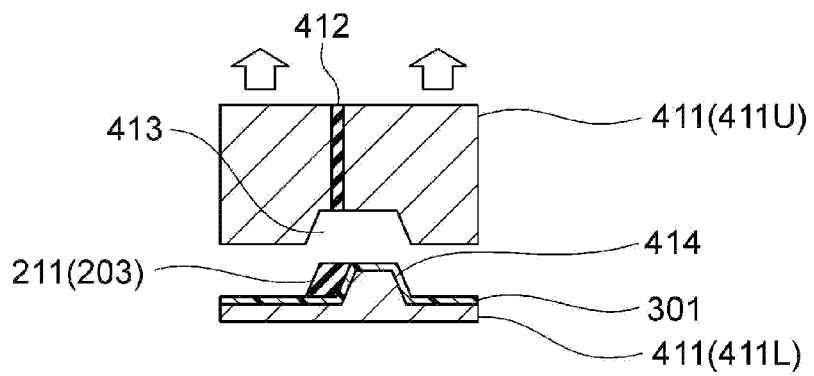

As shown in FIG. 7 (A), the flexible substrate 301 is placed on the lower mold 411L, and the upper mold 411U is placed via the flexible substrate 301. The lower mold 411L is provided with a protrusion 414, and the upper mold 411U is provided with a gate 412 and a cavity 413.

The protrusion 414 provided on the lower mold 411L corresponds to the protrusion 302 provided on the flexible substrate 301 of the second embodiment, and rises at a rising angle of about 70° from the flexible substrate 301 similar to the bead 14B. That is, the protrusion 302 is formed in a shape imitating the side wall 15B of the bead 14B to which the sticking agent 211 serving as the gasket 203 is stuck.

The cavity 413 provided in the upper mold 411U has a shape for arranging the protrusion 414 of the lower mold 411L and forming the gasket 203 in the portion communicating with the gate 412.

As shown in FIG. 7 (B), the material 212 of the sticking agent 211, for example, unvulcanized butyl rubber or the like, which is a rubber-like elastic material, is guided from the gate 412 to the cavity 413.

As shown in FIG. 7 (C), the flexible substrate 301 bends into the shape of the protrusion 414 by the filling pressure of the material 212 of the sticking agent 211 into the cavity 413.

As shown in FIG. 7 (D), by separating the upper mold 411U from the lower mold 411L, the sticking agent 211 is shaped on the flexible substrate 301 along the protrusion 414. The shaped sticking agent 211 becomes the gasket 203.

In order to allow the sticking agent 211 to be shaped on the flexible substrate 301 by separating the upper mold 411U from the lower mold 411L, the flexible substrate 301 is configured to exhibit stronger stickiness than the wall portion of the cavity 413.

(Transfer Step)

The transfer step is a step of transferring the sticking agent 211 shaped on the flexible substrate 301 to the separator 11 to form the gasket 203.

Figure 8:
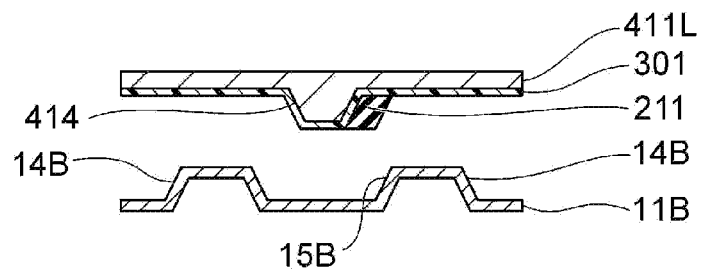
FIGS. 8 (A) through 8 (E) are vertical cross-sectional views temporally showing each step executed upon transferring a sticking agent to a separator as the third embodiment.
Figure 8:
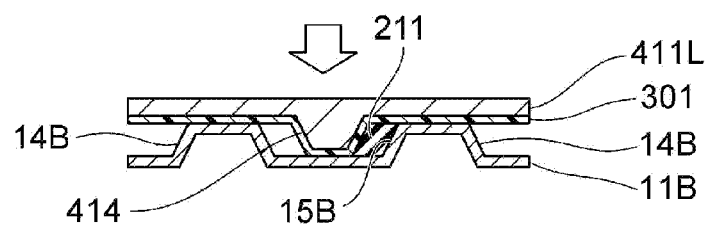
Figure 8:
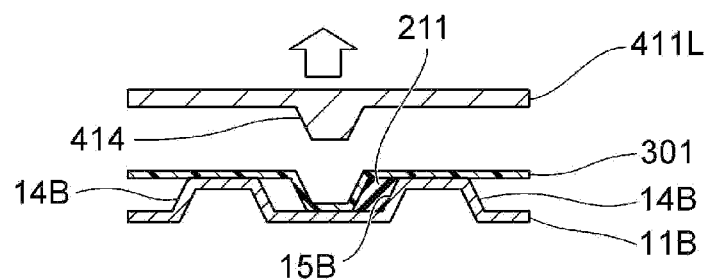
Figure 8:
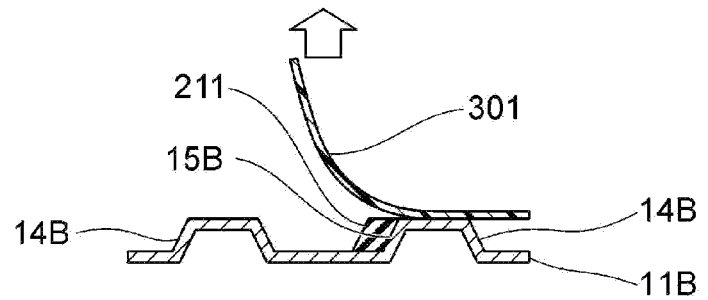
Figure 8:
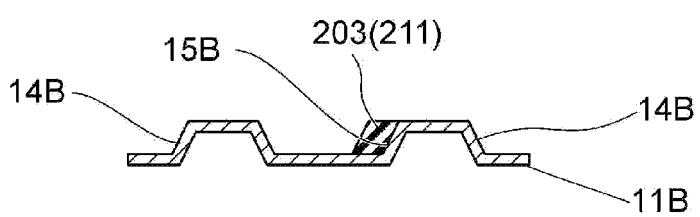

As shown in FIG. 8 (A), the sticking agent 211 shaped on the flexible substrate 301 for each lower mold 411L is made to face the separator 11B on the side in contact with the oxidizing gas (oxygen). The position where they face each other is a fixed position of the gasket 203 with respect to the separator 11B. As shown in FIG. 4, the fixing position of the gasket 203 is the side wall 15B of the bead 14B which is nestedly overlapped with the bead 14A of the separator 11A on the side in contact with the fuel gas (hydrogen).

As shown in FIG. 8 (B), the separator 11B attached to the lower mold 411L and the flexible substrate 301 are brought close to each other, and the sticking agent 211 is brought into contact with the position where the gasket 203 should be fixed. The sticking agent 211 is stuck to the separator 11B due to its own stickiness.

As shown in FIG. 8 (C), the lower mold 411L is removed from the flexible substrate 301. At this time, the bonding force between the flexible substrate 301 and the lower mold 411L is smaller than the sticking force between the separator 11B and the sticking agent 211 and the sticking force between the sticking agent 211 and the flexible substrate 301. Therefore, the lower mold 411L is smoothly removed from the flexible substrate 301.

As shown in FIG. 8 (D), the flexible substrate 301 is bent and peeled from the sticking agent 211. At this time, the separator 11B is configured to exhibit stronger stickiness than the flexible substrate 301. Therefore, the sticking agent 211 maintains a state of remaining stuck to the separator 11B, and the flexible substrate 301 is peeled off from the sticking agent 211.

As shown in FIG. 8 (E), as a result, the sticking agent 211 is fixed to the separator 11B, and the sticking agent 211 becomes the gasket 203.

In this way, the gasket 203 can be formed on the separator 11B. At this time, the separator 11B is not subjected to the pressure at the time of gasket molding, for example, the pressure due to the mold pressing or the injection pressure or the like, and the gasket 203 can be shaped on the separator 11B without causing breakage or damage. Thus, as the separator 11 (11A, 11B), a brittle material such as one made of carbon can be used.

Fourth Embodiment

A fourth embodiment will be described with reference to FIGS. 9 (A) through 9 (C) and FIGS. 11 (A) through 11 (C). The same parts as those of the second embodiment are indicated by the same reference numerals, and a description thereof will also be omitted.

In the present embodiment, the sticking agent 211 is not directly shaped on the flexible substrate 301, but is shaped on an intermediate substrate 351 and transferred from the intermediate substrate 351 to the flexible substrate 301, and further transferred from the flexible substrate 301 to the separator 11.

In a manner similar to the method of the second embodiment, the gasket manufacturing method of the present embodiment also produces a gasket 203 that conforms to the seal structure of the cooling surface seal 201 and the reaction surface seal 202 such as shown in FIG. 4. The gasket manufacturing method is similar to the gasket manufacturing methods of the first and second embodiments even in that it includes the shaping step and the transfer step. However, as described above, it is provided with a two-step transfer step of the intermediate substrate 351 to the flexible substrate 301 (intermediate transfer step) and the flexible substrate 301 to the separator 11 (final transfer step).
(Shaping Step)

The shaping step is a step of shaping the sticking agent 211 to be the gasket 203 on the intermediate substrate 351. The intermediate substrate 351 does not have to have flexibility and may be a member made of a hard material.

Figure 9:
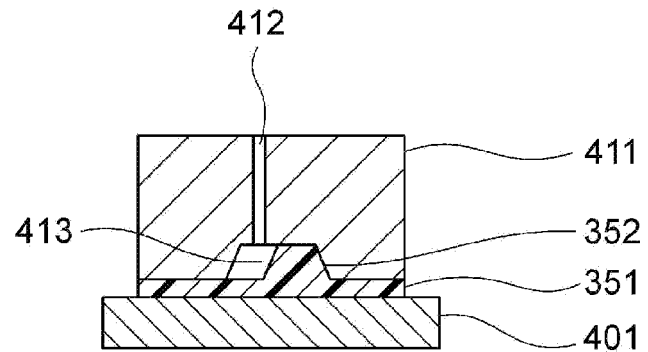
FIGS. 9 (A) through 9 (C) are vertical cross-sectional views temporally showing each step executed upon shaping a sticking agent as a fourth embodiment.
Figure 9:
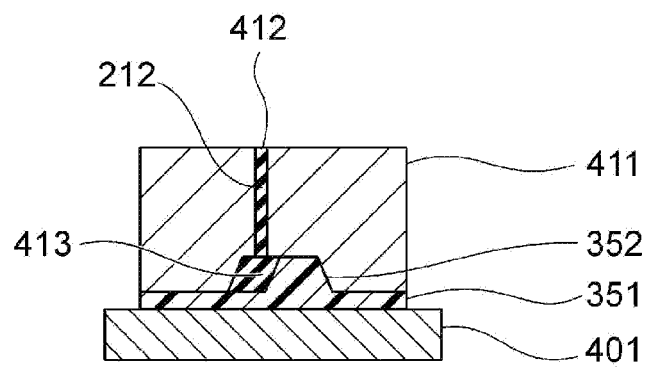
Figure 9:
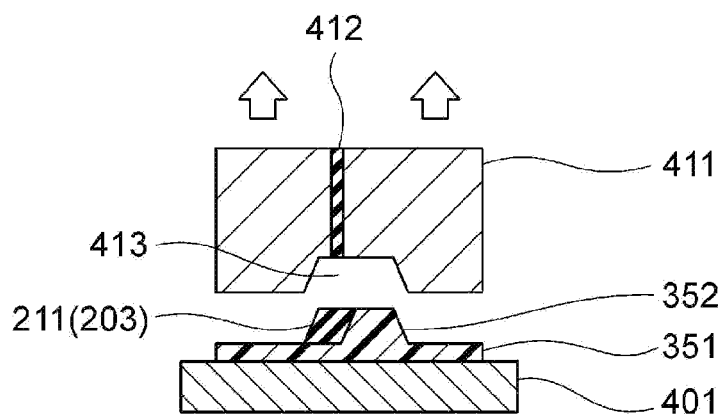

As shown in FIG. 9 (A), the intermediate substrate 351 is placed on the base 401, and the shaping mold 411 is placed via the intermediate substrate 351. The shaping mold 411 is provided with a gate 412 and a cavity 413.

The intermediate substrate 351 includes a protrusion 352 that enters between two adjacent beads 14B provided on one of the pair of separators 11, for example, the separator 11B on the side in contact with the oxidizing gas (oxygen). Similar to the bead 14B, the protrusion 352 rises from the flexible substrate 301 at a rising angle of about 70°. That is, the protrusion 352 is formed in a shape imitating the side wall 15B of the bead 14B to which the sticking agent 211 serving as the gasket 203 is stuck.

The cavity 413 provided in the shaping mold 411 has a shape for arranging the protrusion 352 provided in the intermediate substrate 351 and shaping the gasket 203 in a portion which communicates with the gate 412.

As shown in FIG. 9 (B), the material 212 of the sticking agent 211, for example, unvulcanized butyl rubber or the like, which is a rubber-like elastic material, is guided from the gate 412 to the cavity 413. As the molding method at this time, injection molding or transfer molding is adopted.

As shown in FIG. 9 (C), by separating the shaping mold 411 from the base 401, the sticking agent 211 is shaped on the intermediate substrate 351 along the protrusion 352. The shaped sticking agent 211 becomes the gasket 203.

In order to allow the sticking agent 211 to be shaped on the intermediate substrate 351 by separating the shaping mold 411 from the base 401, the intermediate substrate 351 is configured to exhibit stronger stickiness than the wall portion of the cavity 413.
(Intermediate Transfer Step)

The intermediate transfer step is a step of transferring the sticking agent 211 shaped on the intermediate substrate 351 to the flexible substrate 301. The flexible substrate 301 has a flat shape which is not the shape provided with the protrusion 302 as in the second embodiment.

Figure 10:
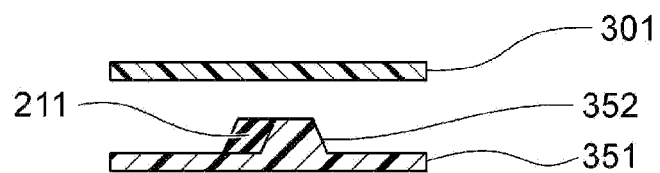
FIGS. 10 (A) through 10 (C) are vertical cross-sectional views temporally showing each step executed upon transfer in a first stage of a sticking agent to a separator as the fourth embodiment.
Figure 10:
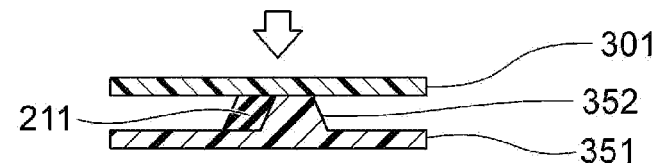
Figure 10:
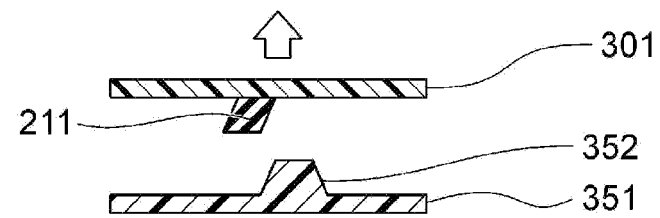

As shown in FIG. 10 (A), the sticking agent 211 shaped on the intermediate substrate 351 is made to face the flexible substrate 301.

As shown in FIG. 10 (B), the flexible substrate 301 and the intermediate substrate 351 are brought close to each other, and the sticking agent 211 is brought into contact with the flexible substrate 301. The sticking agent 211 sticks to the flexible substrate 301 due to its own stickiness.

As shown in FIG. 10 (C), the flexible substrate 301 is separated from the intermediate substrate 351. At this time, the flexible substrate 301 is configured to exhibit stronger stickiness than the intermediate substrate 351. Therefore, the sticking agent 211 maintains a state of remaining stuck to the flexible substrate 301, and the flexible substrate 301 is peeled off from the sticking agent 211.
(Final Transfer Step)

The final transfer step is a step of transferring the sticking agent 211 shaped on the flexible substrate 301 to the separator 11 to form the gasket 203.

Figure 11:
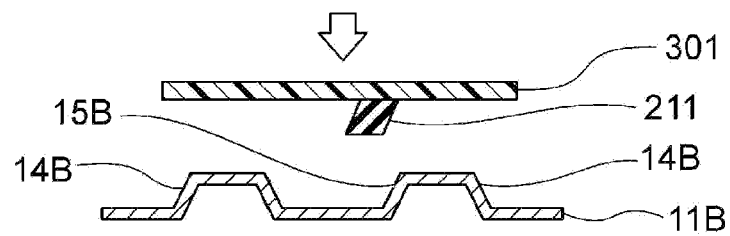
FIGS. 11 (A) through 11 (D) are vertical cross-sectional views temporally showing each step executed upon transfer in a second stage of a sticking agent to a separator as the fourth embodiment.
Figure 11:
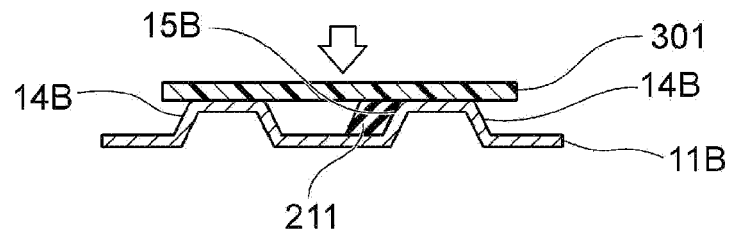
Figure 11:
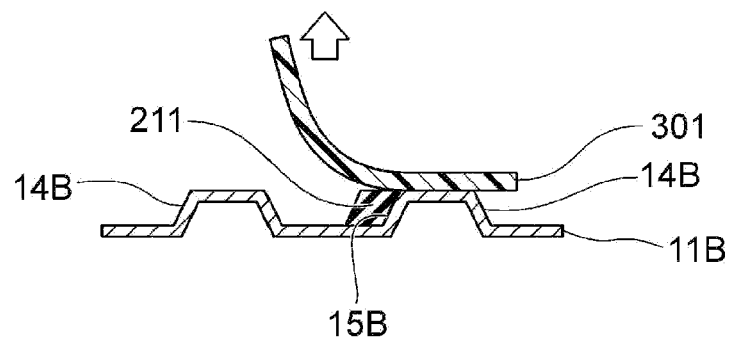
Figure 11:
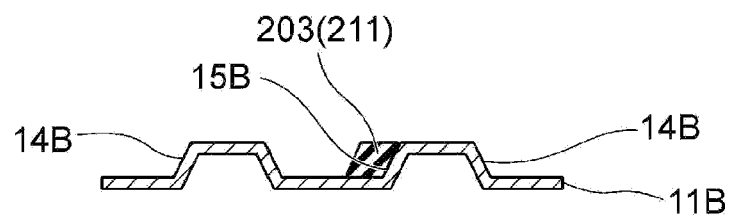

As shown in FIG. 11 (A), the sticking agent 211 shaped on the flexible substrate 301 is made to face the separator 11B on the side in contact with the oxidizing gas (oxygen). The position to face them each other is a fixed position of the gasket 203 with respect to the separator 11B. As shown in FIG. 4, the fixed position of the gasket 203 is the side wall 15B of the bead 14B which is nestedly overlapped with the bead 14A of the separator 11A on the side in contact with the fuel gas (hydrogen).

As shown in FIG. 11 (B), the separator 11B and the flexible substrate 301 are brought close to each other, and the sticking agent 211 is brought into contact with the position where the gasket 203 should be fixed. The sticking agent 211 sticks to the separator 11B due to its own stickiness.

As shown in FIG. 11 (C), the flexible substrate 301 is bent and peeled off from the sticking agent 211. At this time, the separator 11B is configured to exhibit stronger stickiness than the flexible substrate 301. Therefore, the sticking agent 211 maintains a state of remaining stuck to the separator 11B, and the flexible substrate 301 is peeled off from the sticking agent 211.

As shown in FIG. 11 (D), as a result, the sticking agent 211 is fixed to the separator 11B, and the sticking agent 211 becomes the gasket 203.

The sticking agent 211 to be the gasket 203 may or may not be cross-linked as in the first to third embodiments. The cross-linking of the sticking agent 211 is carried out after shaping on the intermediate substrate 351 and then transferring to the flexible substrate 301 or after transferring to the separator 11B.

The gasket 203 can be formed on the separator 11B in this manner. At this time, the separator 11B is not subjected to the pressure at the time of gasket molding, for example, the pressure due to the mold pressing or the injection pressure, etc., and the gasket 203 can be shaped on the separator 11B without causing breakage or damage. Accordingly, as the separator 11 (11A, 11B), a brittle material such as one made of carbon can be used.

As a modification of the present embodiment, a region other than the bead 14B of the separator 11B or the top of the bead 14B provided on the separator 11B may be set as a fixed position of the gasket 203 with respect to the separator 11B. When these modifications are adopted, the sticking agent 211 is shaped on the flat surface of the intermediate substrate 351 in the shaping step, and the sticking agent 211 is intermediate-transferred onto the flat surface of the flexible substrate 301 in the intermediate transfer step.

Thus, in the final transfer step, the sticking agent 211 can be transferred from the flexible substrate 301 to the region other than the bead 14B of the separator 11B or the top of the bead 14B provided on the separator 11B.

Fifth Embodiment

A fifth embodiment will be described with reference to FIGS. 12 (A) through 12 (C) and FIGS. 13 (A) through 13 (D). The same parts as those in the first embodiment are indicated by the same reference numerals, and a description thereof will also be omitted.
(Shaping Process)

The shaping mold 411 of the present embodiment includes an upper mold 411U and a lower mold 411L. The shaping step is a step of shaping the sticking agent 211 to be the gasket 203 into the lower mold 411L.

Figure 12:
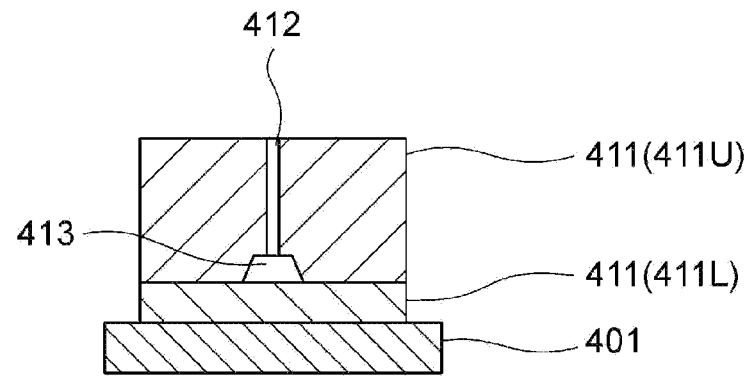
FIGS. 12 (A) through 12 (C) are vertical cross-sectional views temporally showing each step executed upon shaping a sticking agent as a fifth embodiment.
Figure 12:
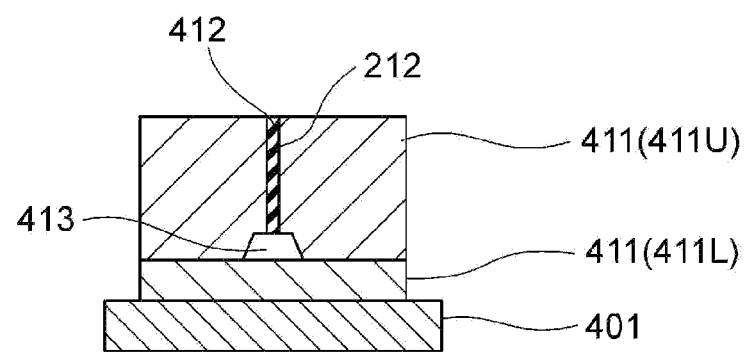
Figure 12:
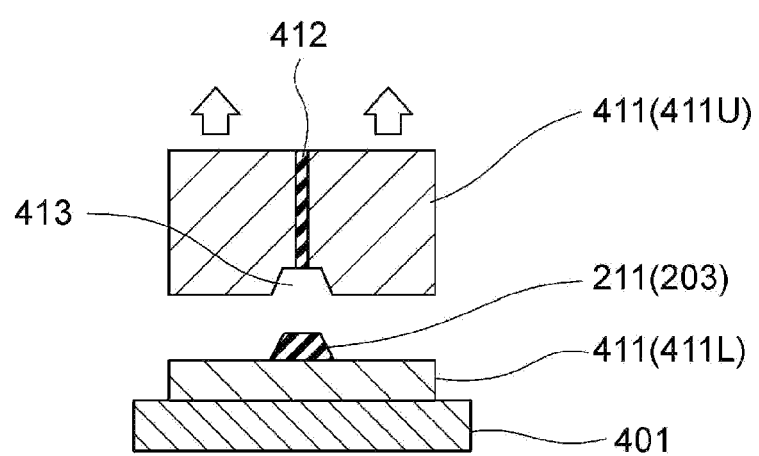

As shown in FIG. 12 (A), the lower mold 411L of the shaping mold 411 is placed on the base 401. The upper mold 411U of the shaping mold 411 is provided with a gate 412 and a cavity 413. The cavity 413 has a shape for forming the gasket 203.

As shown in FIG. 12 (B), the material 212 of the sticking agent 211, for example, unvulcanized butyl rubber or the like, which is a rubber-like elastic material, is guided from the gate 412 to the cavity 413. As the molding method at this time, injection molding or transfer molding is adopted.

As shown in FIG. 12 (C), by separating the shaping mold 411 from the base 401, the sticking agent 211 is shaped on the flat surface of the lower mold 411L. The shaped sticking agent 211 becomes the gasket 203.

In order to separate the shaping mold 411 from the base 401 so that the sticking agent 211 can be shaped on the lower mold 411L, the lower mold 411L is configured to exhibit stronger stickiness than the wall portion of the cavity 413.
(Transfer Step)

The transfer step is a step of transferring the sticking agent 211 shaped on the lower mold 411L to the separator 11 to form the gasket 203.

Figure 13:
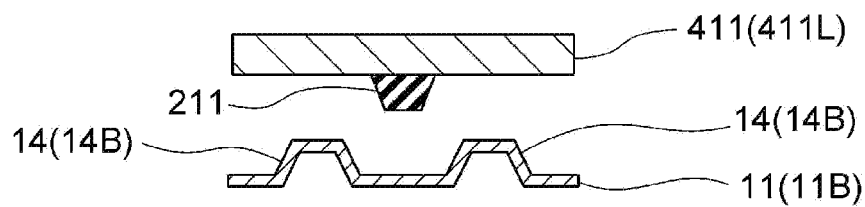
FIGS. 13 (A) through 13 (D) are vertical cross-sectional views temporally showing each step executed upon transferring a sticking agent to a separator as the fifth embodiment.
Figure 13:
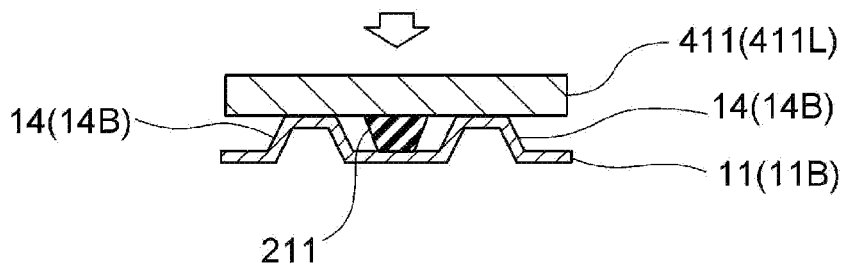
Figure 13:
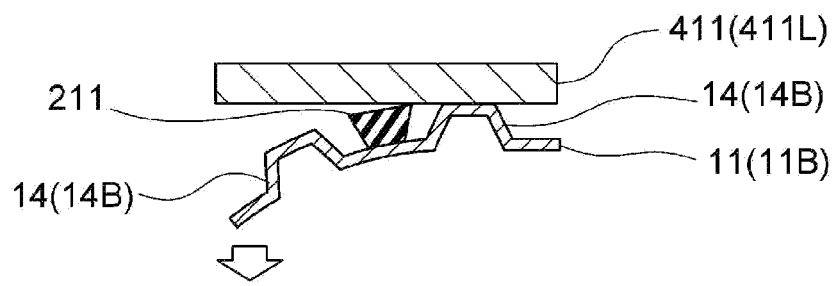
Figure 13:
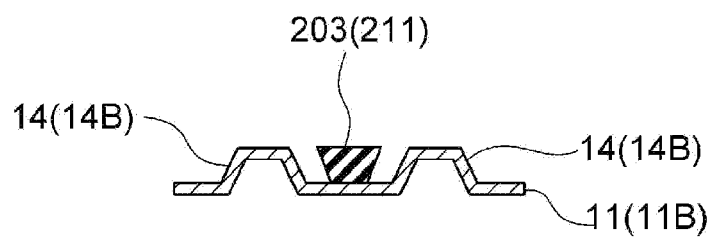

As shown in FIG. 13 (A), the sticking agent 211 shaped on the lower mold 411L is faced with one of the separators 11, for example, the separator 11B on the side in contact with the oxidizing gas (oxygen). The position to face them each other is a fixed position of the gasket 203 with respect to the separator 11B. In the present embodiment, a region other than the bead 14B provided on the separator 11B is set as the fixed position.

As shown in FIG. 13 (B), the separator 11B and the lower mold 411L are brought close to each other, and the sticking agent 211 is brought into contact with the position where the gasket 203 should be fixed. The sticking agent 211 sticks to the separator 11B due to its own stickiness.

As shown in FIG. 13 (C), the separator 11B is bent to peel off the sticking agent 211 from the lower mold 411L. At this time, the separator 11B is configured to exhibit stronger stickiness than the lower mold 411L. Therefore, the sticking agent 211 maintains a state of remaining stuck to the separator 11B and is peeled off from the lower mold 411L.

As shown in FIG. 13 (D), as a result, the sticking agent 211 is fixed to the separator 11B, and the sticking agent 211 becomes the gasket 203.

The sticking agent 211 to server as the gasket 203 may or may not be cross-linked as in the first to fourth embodiments. The cross-linking of the sticking agent 211 is carried out after shaping on the lower mold 411L or after transferring to the separator 11B.

The gasket 203 can be formed on the separator 11B in this manner. At this time, the separator 11B is not subjected to the pressure at the time of gasket molding, for example, the pressure due to the mold pressing or the injection pressure, or the like, and the gasket 203 can be shaped on the separator 11B without causing breakage or damage. Thus, as the separator 11 (11A, 11B), a brittle material such as one made of carbon can be used.

Sixth Embodiment

A sixth embodiment will be described with reference to FIGS. 14 (A) through 14 (C) and FIGS. 15 (A) through 15 (D). The same parts as those in the fifth embodiment are indicated by the same reference numerals, and the description thereof will also be omitted.

The gasket manufacturing method of the present embodiment produces a gasket 203 that conforms to the seal structure of the cooling surface seal 201 and the reaction surface seal 202 as shown in FIG. 4 in a manner similar to the method of the second embodiment. Similar to the gasket manufacturing method of the fifth embodiment, the method of the present embodiment also includes a shaping step and a transfer step.
(Shaping Step)

The shaping step is a step of shaping the sticking agent 211 to be the gasket 203 on the lower mold 411L.

Figure 14:
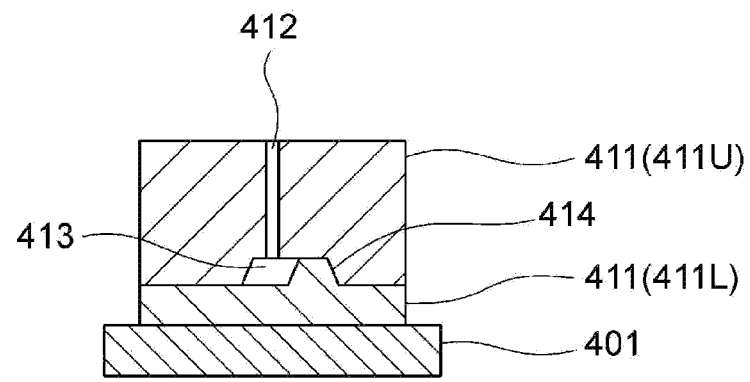
FIGS. 14 (A) through 14 (C) are vertical cross-sectional views temporally showing each step executed upon shaping a sticking agent as a sixth embodiment.
Figure 14:
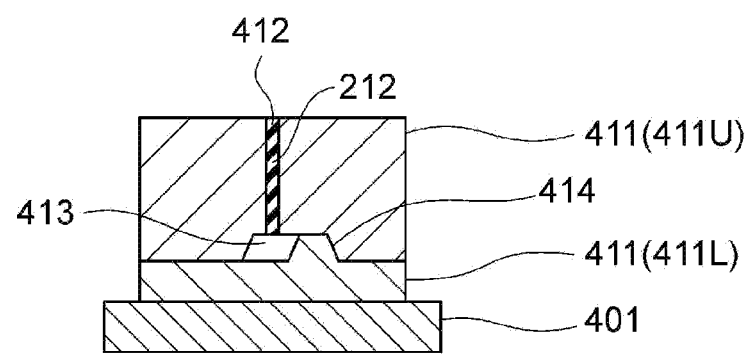
Figure 14:
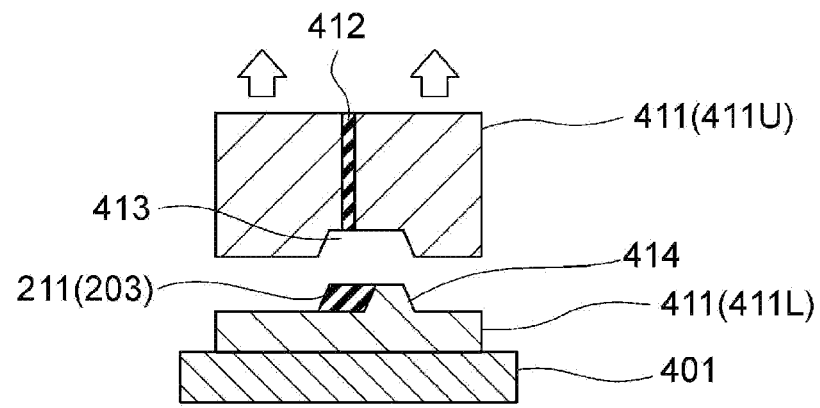

As shown in FIG. 14 (A), the lower mold 411L of the shaping mold 411 is placed on the base 401. The upper mold 411U of the shaping mold 411 is provided with a gate 412 and a cavity 413.

The lower mold 411L is provided with a protrusion 414 that enters between two adjacent beads 14B provided on one of the pair of separators 11, for example, the separator 11B on the side in contact with the oxidizing gas (oxygen). As with the bead 146, the protrusion 414 rises from the lower mold 411L at a rising angle of about 70°. That is, the protrusion 414 is formed in a shape imitating the side wall 15B of the bead 14B to which the sticking agent 211 serving as the gasket 203 sticks.

The cavity 413 provided in the upper mold 411U has a shape for arranging the protrusion 414 of the lower mold 411L and shaping the gasket 203 in a portion communicating with the gate 412.

As shown in FIG. 14 (B), the material 212 of the sticking agent 211, for example, unvulcanized butyl rubber, which is a rubber-like elastic material, is guided from the gate 412 to the cavity 413. As the molding method at this time, injection molding or transfer molding is adopted.

As shown in FIG. 14 (C), by separating the shaping mold 411 from the base 401, the sticking agent 211 is shaped on the lower mold 411L along the protrusion 414. The shaped sticking agent 211 becomes the gasket 203.

In order to separate the shaping mold 411 from the base 401 so that the sticking agent 211 can be shaped on the lower mold 411L, the lower mold 411L is configured to exhibit stronger stickiness than the wall portion of the cavity 413. (Transfer Process)

The transfer step is a step of transferring the sticking agent 211 shaped on the lower mold 411L to the separator 11 to shape the gasket 203.

Figure 15:
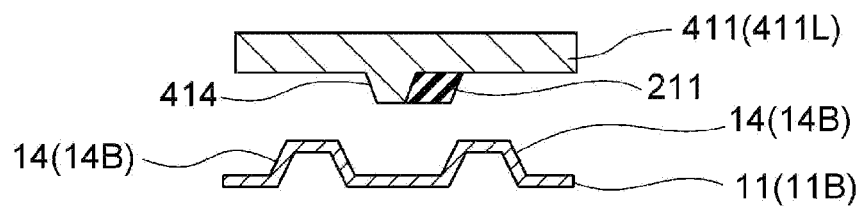
FIGS. 15 (A) through 15 (D) are vertical cross-sectional views temporally showing each step executed upon transferring a sticking agent to a separator as the sixth embodiment.
Figure 15:
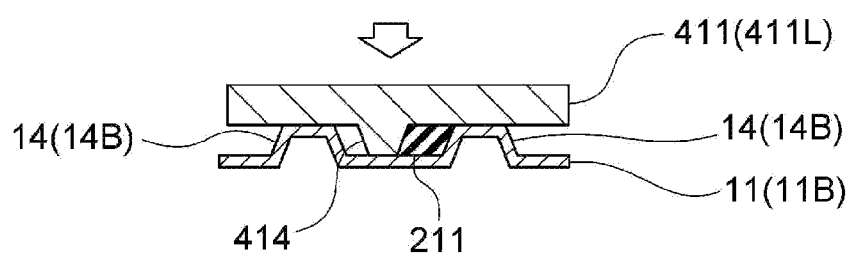
Figure 15:
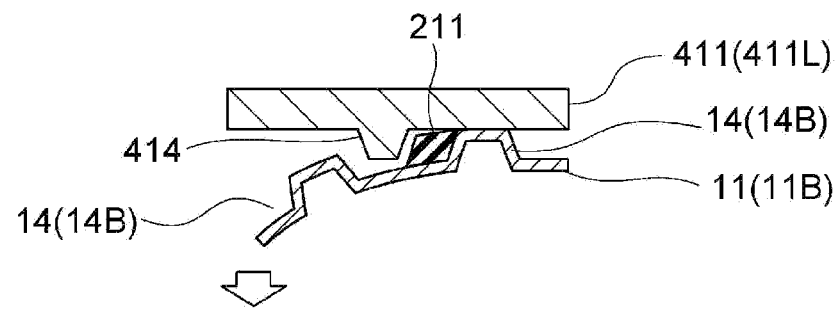
Figure 15:
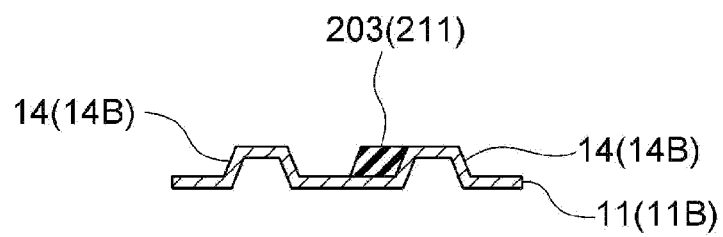

As shown in FIG. 15 (A), the sticking agent 211 shaped on the lower mold 411L is faced with one of the separators 11, for example, the separator 11B on the side in contact with the oxidizing gas (oxygen). The position to face them each other is a fixed position of the gasket 203 with respect to the separator 11B. As shown in FIG. 4, the fixed position of the gasket 203 is the side wall 15B of the bead 14B which is nestedly overlapped with the bead 14A of the separator 11A on the side in contact with the fuel gas (hydrogen).

As shown in FIG. 15 (B), the separator 11B and the lower mold 411L are brought close to each other, and the sticking agent 211 is brought into contact with the position where the gasket 203 should be fixed. The sticking agent 211 sticks to the separator 11B due to its own stickiness.

As shown in FIG. 15 (C), the separator 11B is bent to peel off the sticking agent 211 from the lower mold 411L. At this time, the separator 11B is configured to exhibit stronger stickiness than the lower mold 411L. Therefore, the sticking agent 211 maintains a state of remaining stuck to the separator 11B and is peeled off from the lower mold 411L.

As shown in FIG. 15 (D), as a result, the sticking agent 211 is fixed to the separator 11B, and the sticking agent 211 becomes the gasket 203.

The gasket 203 can be shaped on the separator 11B in this manner. At this time, the separator 116 is not subjected to the pressure at the time of gasket molding, for example, the pressure due to the mold pressing or the injection pressure, etc., and the gasket 203 can be shaped on the separator 11B without causing breakage or damage. Thus, as the separator 11 (11A, 11B), a brittle material such as one made of carbon can be used.

DESCRIPTION OF REFERENCE NUMERALS 1 fuel cell
2 fuel battery cell
11, 11A, 11B separator
12 arrangement region
13 manifold
14, 14A, 14B bead
15, 15A, 15B side wall
101 membrane electrode assembly
102 electrolyte membrane (mating member)
103 manifold
201 cooling surface seal
202 reaction surface seal
203 gasket
211 sticking agent
212 material
301 flexible substrate
302 protrusion
351 intermediate substrate
352 protrusion
401 base
411 shaping mold
411U upper mold
411L lower mold
412 cavity
413 gate
414 protrusion

The invention claimed is:

1. A method for manufacturing a fuel battery separator gasket, comprising:
shaping a sticking agent to be a gasket on a flexible substrate having flexibility by using a shaping mold; and
transferring the sticking agent shaped on the flexible substrate to one of a pair of separators facing each other with a mating member interposed therebetween and each having a bead forming a flow path of fluid between the bead and the mating member in close contact with the mating member to shape the gasket, wherein
in the shaping the sticking agent, by the sticking agent exhibiting a stronger stickiness to the flexible substrate in comparison to a stickiness to a wall portion of the shaping mold, the sticking agent remains on the flexible substrate upon separating the shaping mold from the flexible substrate,
in the transferring the sticking agent, by the sticking agent exhibiting a stronger stickiness to the one of the pair of separators in comparison to the stickiness to the flexible substrate, the sticking agent remains on the one of the pair of separators upon separating the flexible substrate from the sticking agent.

2. A method for manufacturing a fuel battery separator gasket, comprising:
shaping a sticking agent to be a gasket on a flexible substrate having flexibility by using a shaping mold; and
transferring the sticking agent shaped on the flexible substrate to one of a pair of separators facing each other with a mating member interposed therebetween and each having a bead forming a flow path of fluid between the bead and the mating member in close contact with the mating member to shape the gasket, wherein a transfer position of the sticking agent is a side surface of the bead.

3. The method for manufacturing the fuel battery separator gasket according to claim 2, wherein a shaping position of the sticking agent is a side wall of a protrusion provided on the flexible substrate, which enters between the two adjacent beads.

4. The method for manufacturing the fuel battery separator gasket according to claim 3, wherein the protrusion of the flexible substrate is shaped by embossing the sticking agent against the shaping mold by filling pressure thereof.

5. A method for manufacturing a fuel battery separator gasket, comprising:
shaping a sticking agent to be a gasket on an intermediate substrate by using a shaping mold;
transferring the sticking agent shaped on the intermediate substrate to a flexible substrate having flexibility; and
transferring the sticking agent transferred to the flexible substrate to one of a pair of separators facing each other with a mating member interposed therebetween and each having a bead forming a flow path of fluid between the bead and the mating member in close contact with the mating member to shape the gasket.

6. The method for manufacturing the fuel battery separator gasket according to claim 5, wherein a transfer position of the sticking agent is a side surface of the bead.

7. The method for manufacturing the fuel battery separator gasket according to claim 6, wherein a shaping position of the sticking agent is a side surface of a protrusion provided in the intermediate substrate.

8. A method for manufacturing a fuel battery separator gasket, comprising:
   shaping a sticking agent to be a gasket on a lower mold of a shaping mold having an upper mold and the lower mold; and
   transferring the sticking agent shaped on the lower mold to one of a pair of separators facing each other with a mating member interposed therebetween and each having a bead forming a flow path of fluid between the bead and the mating member in close contact with the mating member to shape the gasket,
   wherein
   in the shaping the sticking agent, by the sticking agent exhibiting a stronger stickiness to the lower mold in comparison to a stickiness to a wall portion of the upper mold, the sticking agent remains on the lower mold upon separating the upper mold from the lower mold,
   in the transferring the sticking agent, by the sticking agent exhibiting a stronger stickiness to the one of the pair of separators in comparison to the stickiness to the lower mold, the sticking agent remains on the one of the pair of separators upon separating the lower from the sticking agent.

9. A method for manufacturing a fuel battery separator gasket, comprising:
   shaping a sticking agent to be a gasket on a lower mold of a shaping mold having an upper mold and the lower mold, and
   transferring the sticking agent shaped on the lower mold to one of a pair of separators facing each other with a mating member interposed therebetween and each having a bead forming a flow path of fluid between the bead and the mating member in close contact with the mating member to shape the gasket, and
   wherein a transfer position of the sticking agent is a side surface of the bead.

10. The method for manufacturing the fuel battery separator gasket according to claim 9, wherein a shaping position of the sticking agent is a side surface of a protrusion provided on the lower mold which enters between the two adjacent beads.

11. The method for manufacturing the fuel battery separator gasket according to claim 2, further comprising:
    in the shaping the sticking agent, by the sticking agent exhibiting a stronger stickiness to the flexible substrate in comparison to a stickiness to a wall portion of the shaping mold, the sticking agent remains on the flexible substrate upon separating the shaping mold from the flexible substrate,
    in the transferring the sticking agent, by the sticking agent exhibiting a stronger stickiness to the one of the pair of separators in comparison to the stickiness to the flexible substrate, the sticking agent remains on the one of the pair of separators upon separating the flexible substrate from the sticking agent.

12. The method for manufacturing the fuel battery separator gasket according to claim 11, wherein a shaping position of the sticking agent is a side wall of a protrusion provided on the flexible substrate, which enters between the two adjacent beads.

13. The method for manufacturing the fuel battery separator gasket according to claim 12, wherein the protrusion of the flexible substrate is shaped by embossing the sticking agent against the shaping mold by filling pressure thereof.

14. The method for manufacturing the fuel battery separator gasket according to claim 5, further comprising:
    in the shaping the sticking agent, by the sticking agent exhibiting a stronger stickiness to the intermediate substrate in comparison to a stickiness to a wall portion of the shaping mold, the sticking agent remains on the intermediate substrate upon separating the shaping mold from the intermediate substrate,
    in the transferring the sticking agent from the intermediate substrate to the flexible substrate, by making the sticking agent exhibiting a stronger stickiness to the flexible substrate in comparison to the stickiness to the intermediate substrate, the sticking agent remains on the flexible substrate upon separating the flexible substrate from the intermediate substrate, and
    in the transferring the sticking agent from the flexible substrate to the one of the pair of separators, by making the sticking agent exhibit stronger stickiness to the one of the pair of separators in comparison to the flexible substrate, the sticking agent remains on the one of the pair of separators upon separating the flexible substrate from the sticking agent.

15. The method for manufacturing the fuel battery separator gasket according to claim 14, wherein a transfer position of the sticking agent is a side surface of the bead.

16. The method for manufacturing the fuel battery separator gasket according to claim 15, wherein a shaping position of the sticking agent is a side surface of a protrusion provided in the intermediate substrate.

17. The method for manufacturing the fuel battery separator gasket according to claim 9,
    wherein
    in the shaping the sticking agent, by the sticking agent exhibiting a stronger stickiness to the lower mold in comparison to a stickiness to a wall portion of the upper mold, the sticking agent remains on the lower mold upon separating the upper mold from the lower mold,
    in the transferring the sticking agent, by the sticking agent exhibiting a stronger stickiness to the one of the pair of separators in comparison to the stickiness to the lower mold, the sticking agent remains on the one of the pair of separators upon separating the lower from the sticking agent.

18. The method for manufacturing the fuel battery separator gasket according to claim 17, wherein a shaping position of the sticking agent is a side surface of a protrusion provided on the lower mold which enters between the two adjacent beads.

* * * * *